(12) United States Patent
Cheron et al.

(10) Patent No.: US 12,345,330 B2
(45) Date of Patent: Jul. 1, 2025

(54) GEARBOX WITH A BLOCKING MECHANISM

(71) Applicant: VALEO EMBRAYAGES, Amiens (FR)

(72) Inventors: Antonin Cheron, Cergy Pontoise (FR); Fabien Diascorn, Cergy Pontoise (FR); Christophe Dhalleine, Cergy Pontoise (FR); Fabien Lebeau, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/390,709

(22) Filed: Dec. 20, 2023

(65) Prior Publication Data

US 2024/0209939 A1     Jun. 27, 2024

(30) Foreign Application Priority Data

Dec. 23, 2022   (FR) .................................... 22 14463

(51) Int. Cl.
*F16H 63/34*  (2006.01)
*B60T 1/00*  (2006.01)
*F16D 63/00*  (2006.01)

(52) U.S. Cl.
CPC .......... *F16H 63/3425* (2013.01); *B60T 1/005* (2013.01); *F16D 63/006* (2013.01)

(58) Field of Classification Search
CPC .. F16H 63/34; F16H 63/3416; F16H 63/3425; F16H 63/3433; B60T 1/005; B60T 1/062; F16D 63/006
USPC ..................................................... 192/219.5
See application file for complete search history.

(56) References Cited

U.S. PATENT DOCUMENTS

| 5,295,412 A | * | 3/1994 | Donato | ................... B60T 1/005 |
| | | | | 74/577 M |
| 2012/0018259 A1 | | 1/2012 | Prix | |
| 2020/0200270 A1 | * | 6/2020 | Lenke | ................. F16H 63/3425 |
| 2021/0156470 A1 | * | 5/2021 | Williams | ............ F16H 63/3425 |

FOREIGN PATENT DOCUMENTS

| DE | 10131735 A1 | * | 1/2003 | ......... F16H 63/3416 |
| DE | 101 44 063 A1 | | 3/2003 | |
| DE | 102017213050 A1 | * | 1/2019 | ......... F16H 63/3425 |
| DE | 102019109381 A1 | * | 10/2019 | ......... F16H 63/3416 |
| EP | 2 410 214 B1 | | 9/2013 | |
| JP | H07100432 B2 | * | 11/1995 | ......... F16H 63/3416 |

* cited by examiner

*Primary Examiner* — Richard M Lorence
(74) *Attorney, Agent, or Firm* — Oblon, McClelland, Maier & Neustadt, L.L.P.

(57) ABSTRACT

A gearbox includes a transmission casing and a blocking mechanism for a vehicle. The blocking mechanism includes a pawl having a locking finger able to be engaged in a locking recess, an actuator which moves a mobile carriage having first and second rollers, and a guide rail attached to the casing. The guide rail forms an attachment wall and a guide wall, the first roller being placed in contact with the second roller and with the pawl, and the second roller being placed in contact with the guide wall. The guide rail is attached to the casing by an attachment mechanism, the guide rail and the attachment mechanism collaborating in such a way that the attachment wall is held against the casing while being able to be moved relative to this same attachment mechanism.

6 Claims, 3 Drawing Sheets

[Fig. 1]
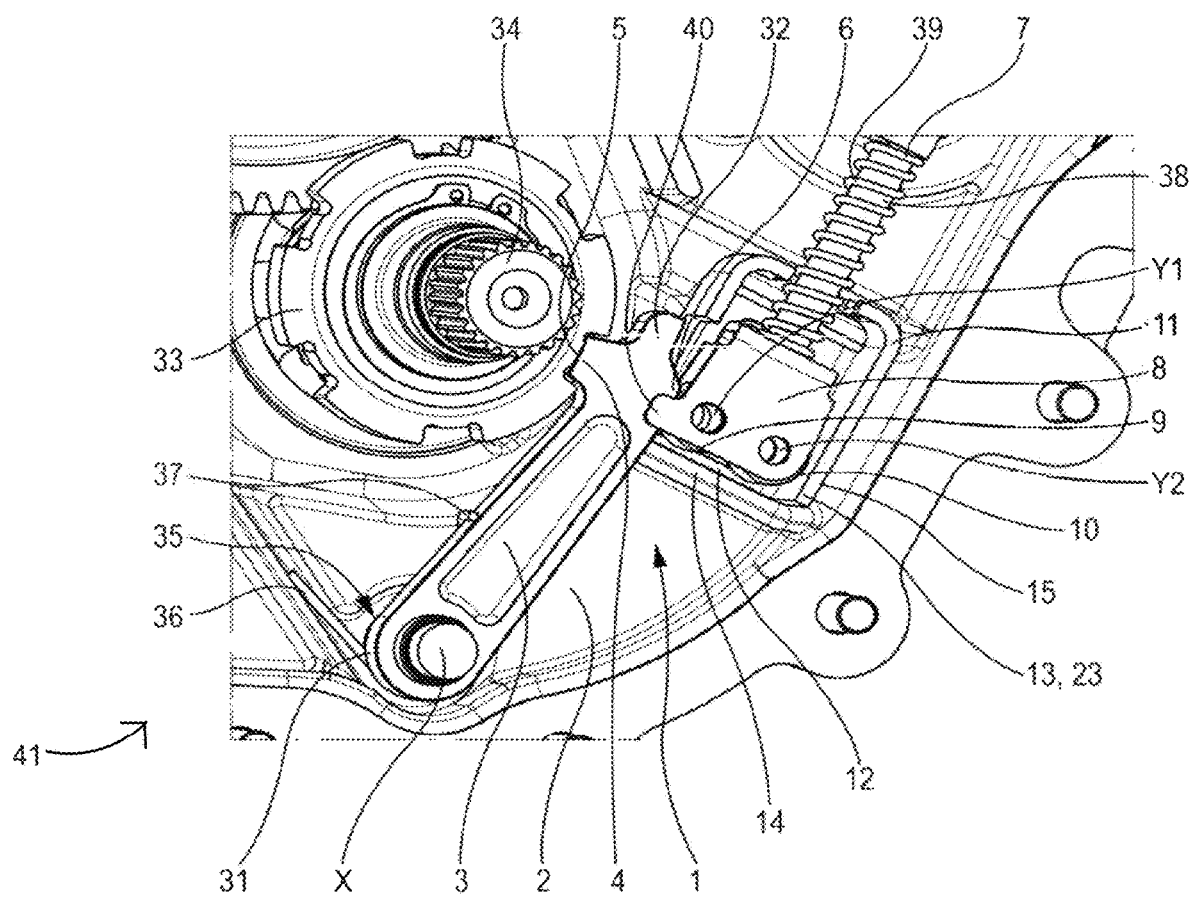

[Fig.2A]
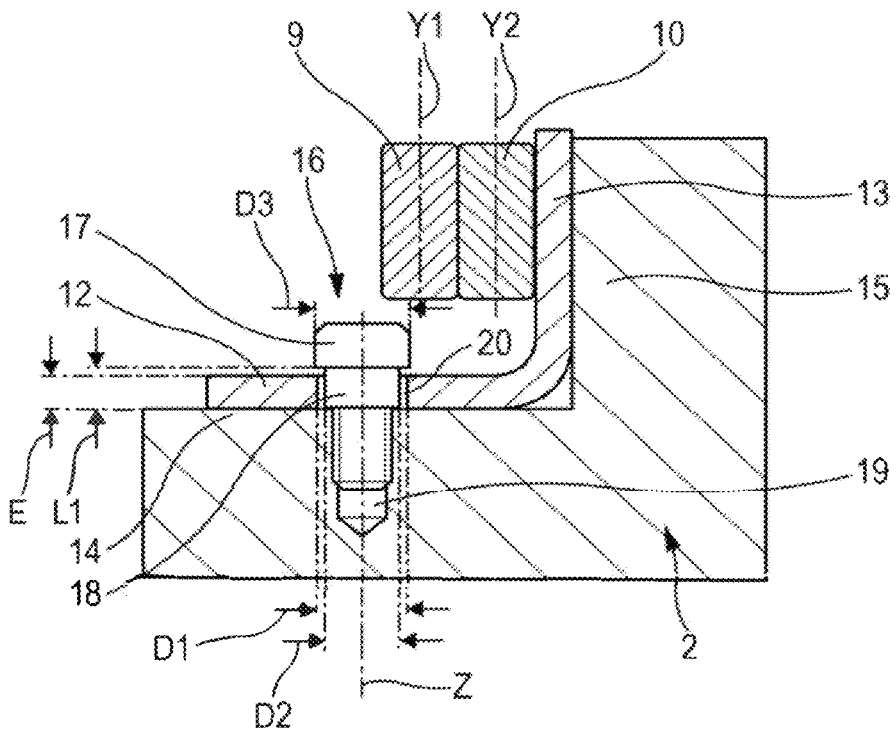
[Fig.2B]
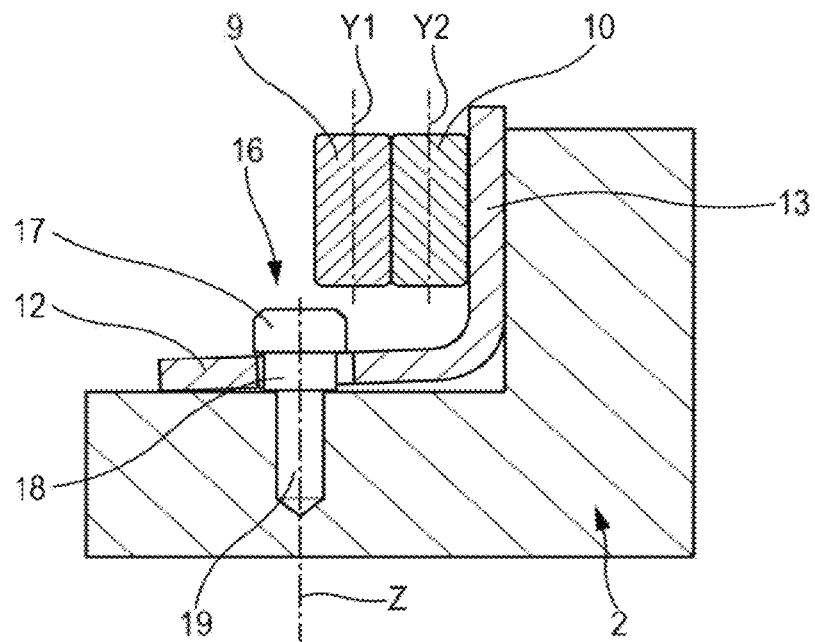

[Fig. 3]
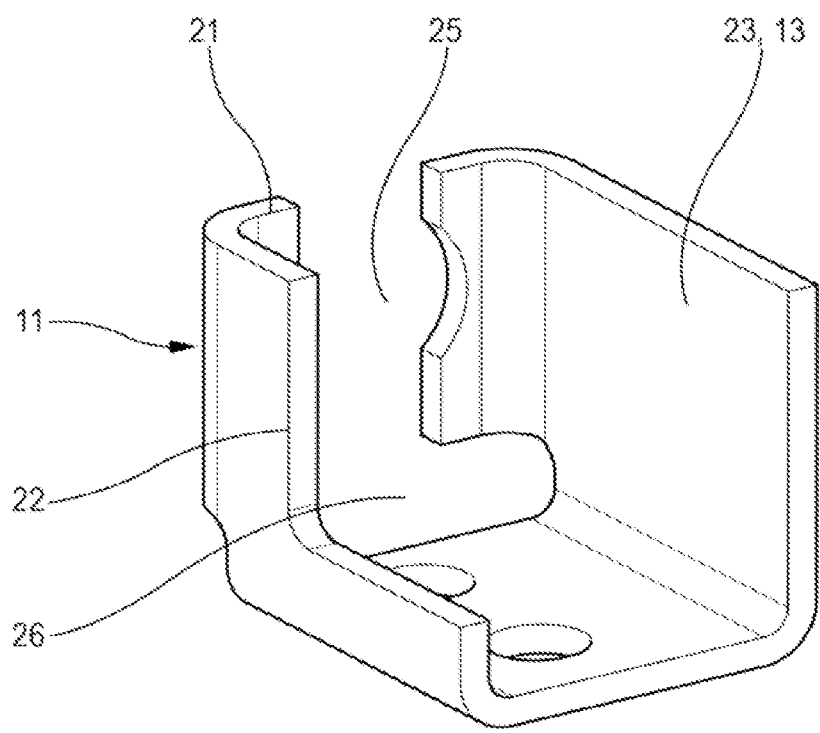

GEARBOX WITH A BLOCKING MECHANISM

BACKGROUND OF THE INVENTION

Field of the Invention

The present invention relates to a gearbox comprising a transmission casing and a blocking mechanism for rotationally blocking a shaft of a drivetrain of a mobility apparatus, such as a motor vehicle for example.

Description of the Related Art

Blocking mechanisms are used, for example, as a parking brake for securing a stationary motor vehicle. In such a case, they make it possible to rotationally block a transmission shaft of the motor vehicle. Such blocking mechanisms are in particular used in motor vehicles with automatic transmission, in hybrid vehicles or electric vehicles. The blocking mechanism is in particular intended for immobilizing a vehicle, for example a car, when it is parked.

When the blocking mechanism is activated, its components may be subject to significant loads. Thus, the components of the blocking mechanism must be able to withstand considerable force in order to ensure reliable blocking.

Blocking mechanisms comprising a pawl having a locking finger pivotably mounted on the transmission casing between a release position and a locking position in which the locking finger is inserted in a locking recess secured to, in order to rotate as one with, the transmission shaft that is to be blocked, are known. The blocking mechanism further includes a linear actuator that moves a mobile carriage which is guided in translation on the transmission casing by means of a guide rail. The mobile carriage includes a first roller which interacts with a cam surface of the mobile pawl in such a way that a translational movement of the mobile carriage causes the mobile pawl to pivot. The carriage also comprises a second roller arranged between the first roller and the guide rail. The guide rail is a piece of stamped sheet metal. It includes, on the one hand, an attachment wall which is attached by means of attachment members, such as screws, to a corresponding wall of the transmission casing and, on the other hand, a guide wall against which the second roller of the mobile carriage rolls and which is substantially perpendicular to another plane in which the attachment wall extends. The guide wall is placed bearing back to back against a corresponding other wall of the transmission casing. Each roller has an axis of rotation that is positioned substantially perpendicular to the attachment wall.

Now, because of the manufacturing tolerances needed for the procedure of bending the piece, there may be geometric defects in the piece. The angle formed between the attachment wall and the guide wall is therefore liable to vary around 90°. Furthermore, such a guide rail has a tendency to become deformed under the various mechanical stresses. In particular, a lack of parallelism between the guide wall and that wall of the transmission casing against which the guide wall is pressed, may arise. This results in a lack of parallelism between the two axes of rotation of the two rollers. This means that there is a risk that all of the load will be concentrated in just part of the second roller rather than being distributed over its entire height. The rollers may jam relative to one another and not perform their function correctly.

BRIEF SUMMARY OF THE INVENTION

However, it is important to ensure precise positioning of the guide wall of the guide rail relative to the pawl so as, on the one hand, to ensure reliable blocking and, on the other hand, to prevent excessively high loads from passing through the blocking mechanism and thus potentially damaging the latter.

BRIEF DESCRIPTION OF THE INVENTION

It is thus necessary to propose a blocking mechanism which is reliable, inexpensive, easy to implement and withstands high loads.

One idea forming the basis of the invention is a blocking mechanism for rotationally blocking a shaft of a vehicle.

One idea forming the basis of the invention is a gearbox comprising a transmission casing and a blocking mechanism which makes it possible to solve one or more technical problems encountered in the prior art, for example the abovementioned problems.

The invention relates to a gearbox comprising a transmission casing and a locking mechanism contained into the transmission casing, the blocking mechanism is able to rotationally blocking a transmission shaft of a mobility device having at least one locking recess, the blocking mechanism comprising:
  a mobile pawl comprising a locking finger, the mobile pawl being pivotably mounted in a plane about a pivot axis on the transmission casing between a locking position in which the locking finger is engaged in the locking recess and a release position in which the locking finger is disengaged from said locking recess, the mobile pawl comprising a cam surface,
  a linear actuator which moves a mobile carriage, the mobile carriage comprising a first roller and a second roller,
  a guide rail attached to the transmission casing, the mobile carriage being guided by the guide rail,
  the guide rail forming an attachment wall and a guide wall which are back to back against a corresponding wall of the transmission casing, the attachment wall and the guide wall being positioned orthogonal to one another,
  the first roller is placed with a first axis of rotation arranged perpendicular to the attachment wall while being placed in contact with the second roller and with the mobile pawl,
  the second roller is placed with a second axis of rotation arranged perpendicular to the attachment wall while being placed in contact with the guide wall,
  the guide rail being mounted attached to the transmission casing by an attachment means, the guide rail and the attachment means collaborating with one another in such a way that the attachment wall is held against the transmission casing while being able to be moved relative to this same attachment means.

What is meant by a transmission casing is any type of support. In one preferred example, the transmission casing is a housing containing at least two transmission shafts and at least one gearwheel, one of the two transmission shafts being a main transmission shaft able to be connected to a rotor shaft of an electric machine.

By virtue of these features, the guide rail is held against the transmission casing while at the same time allowing for some play in order to compensate for defects in the geometry of the piece. Through this type of attachment according to the invention, it is the force of operation of the mobile pawl that presses the second roller in place, rather than the attachment means as in the prior art.

Because of the play there is, on the one hand, between the attachment wall and the attachment means and, on the other hand, between the attachment wall and the transmission casing, the position of the guide wall of the guide rail can be constantly adjusted to suit the corresponding wall of the casing while remaining permanently back to back against that same wall of the transmission casing. This ensures that the first roller and the second roller collaborate as effectively as possible with their respective axes of rotation Y1, Y2 parallel to one another. This then ensures that the loads applied by the mobile pawl will be distributed as uniformly as possible along the rollers and along the guide wall.

According to one embodiment of the invention, the attachment wall of the blocking mechanism is attached to the transmission casing with a predefined amount of play between the attachment means and the transmission casing. The amount of play is predefined so that the attachment wall can be moved around in space in order to allow adjustment of the guide wall in translational movement parallel to the corresponding wall of the transmission casing.

According to one embodiment of the invention, the guide rail of the blocking mechanism is attached to the transmission casing in such a way that the guide wall can be moved against the corresponding wall of the casing without becoming detached from this same wall, unlike the attachment wall which can be detached from the corresponding wall of the casing.

According to one embodiment, the attachment wall of the guide rail of the blocking mechanism has a thickness comprised between 1.5 mm and 3.5 mm, and preferably between 2.5 mm and 3 mm.

By virtue of these features, when the mobile carriage is moving relative to the guide rail, the friction forces between the mobile carriage and the guide rail are reduced. Therefore, movement of the mobile carriage is ensured without wear of the mobile carriage or of the guide rail.

According to one embodiment of the invention, the attachment means of the blocking mechanism is formed of a step screw having a screw head, a stepped portion and a shank, the shank being intended to be driven into the transmission casing, the stepped portion being intended to be positioned above the transmission casing, a length of the stepped portion between the screw head and the transmission casing being greater than a thickness of the attachment wall of the guide rail. The length of the stepped portion is measured along an axis of elongation of the step screw. The thickness of the attachment wall is measured along an axis parallel to the axis of elongation of the step screw.

According to one embodiment of the invention, the step screw of the blocking mechanism is inserted through an orifice formed in the thickness of the attachment wall, the orifice having a first diameter greater than a second diameter of the stepped portion of the screw and less than a third diameter of the screw head. Thus, the guide wall cannot be completely detached from the casing because it is held by the screw head that prevents it from being removed from the transmission casing.

According to another embodiment, the orifice may also be of oblong shape. Such a shape allows a lesser freedom to move in a direction parallel to the direction of travel of the carriage and a greater freedom to move in a perpendicular direction.

According to one embodiment of the invention, the guide rail of the blocking mechanism is made as a single piece from a bent metal strip.

The invention also relates to a transmission system comprising a shaft having at least one locking recess and a blocking mechanism of the gearbox as defined above.

According to one embodiment, the shaft comprises a wheel including the at least one locking recess. For example, the wheel is a ratchet wheel.

According to one embodiment, the wheel includes 1 to 12 locking recesses.

According to one embodiment, the plurality of recesses are uniformly spaced.

The invention further relates to a motor vehicle comprising a transmission system as defined above.

The invention further relates to a transmission system comprising a shaft having at least one locking recess and a blocking mechanism of the gearbox as described above.

The invention further relates to a motor vehicle comprising a gearbox as described above.

BRIEF DESCRIPTION OF THE SEVERAL VIEWS OF THE DRAWINGS

The invention will be better understood upon reading the following description and examining the accompanying figures. These figures are given solely by way of entirely non-limiting illustration of the invention.

FIG. 1 is a perspective view of a gearbox comprising a blocking mechanism according to one embodiment;

FIGS. 2A and 2B illustrate a schematic view in section of a portion of a blocking mechanism according to one embodiment;

FIG. 3 illustrates, in perspective, a guide rail according to the embodiment of FIG. 1.

DETAILED DESCRIPTION OF THE INVENTION

FIG. 1 illustrates a gearbox 41 comprising a blocking mechanism 1 intended to block the rotation of a transmission shaft of a vehicle according to one embodiment of the invention. The blocking mechanism 1 is mounted on a transmission casing 2 and comprises a mobile pawl 3 comprising a locking finger 4. The mobile pawl 3 is pivotably mounted in a plane about a pivot axis X on the transmission casing 2 between a locking position in which the locking finger 4 is engaged in a locking recess 5 and a release position in which the locking finger 4 is disengaged from said locking recess 5. The mobile pawl 3 comprises a cam surface 6. The blocking mechanism 1 also comprises a linear actuator 7 that moves a mobile carriage 8. The mobile carriage 8 comprises a first roller 9 and a second roller 10. A guide rail 11 is connected to the transmission casing 2. The mobile carriage 8 is guided by the guide rail 11.

In FIGS. 2A and 2B the guide rail 11 forms an attachment wall 12 and a guide wall 13. The attachment wall 12 and the guide wall 13 are back to back with a corresponding wall 14, 15 of the transmission casing 2. The attachment wall 12 and the guide wall 13 each extend in a plane, one perpendicular to the other. The first roller 9 is placed with a first axis of rotation Y1 arranged perpendicular to the attachment wall 12 while being placed in contact with the second roller 10 and with the mobile pawl 3. The second roller 10 is placed with a second axis of rotation Y2 arranged perpendicular to the attachment wall 12 while being placed in contact with the guide wall 13.

In FIGS. 2A and 2B the guide rail 11 is mounted attached to the transmission casing 2 via a step screw 16. The step screw 16, has a screw head 17, a stepped portion 18 and a shank 19. The shank 19 is driven into the transmission casing 2. The stepped portion 18 is positioned above the transmission casing 2. The stepped portion 18 has a length L1, measured along an axis of elongation Z of the step screw 16, between the screw head 17 and the transmission casing 2. This length L1 is greater than a thickness E of the attachment wall 12 of the guide rail 11. The thickness E of the attachment wall 12 is measured along an axis parallel to the axis of elongation Z of the step screw 16. The axis of elongation Z, the axes of rotation Y1 and Y2 are substantially parallel to one another.

The step screw 16 is inserted through an orifice 20 formed in the thickness E of the attachment wall 12. The orifice 20 has a diameter D1 greater than a diameter D2 of the stepped portion 18 of the step screw 16 and less than a diameter D3 of the screw head 17. Thus, the attachment wall 12 is held against the transmission casing 2 by the screw head 17. In another example, the orifice could be of oblong shape (not illustrated).

In FIG. 3, the guide rail 11 has a lateral wall 21 and a first longitudinal wall 22 facing and distant from a second longitudinal wall 23. The second longitudinal wall 23 corresponds to the guide wall 13 as described above.

The second longitudinal wall 23, 13 of the guide rail 11 is configured in such a way as to be in contact with the corresponding wall 15 formed by the transmission casing 2, see FIGS. 1, 2A and 2B.

Furthermore, the lateral wall 21 comprises a notch 25 intended to allow the passage of the linear actuator 7 which is illustrated in FIG. 1. The notch 25 has a "U" shape.

The first longitudinal wall 22 of the guide rail 11 has an opening 26 allowing contact between the mobile carriage 8 situated in the guide rail 11 and the mobile pawl 3 situated level with the opening 26.

The lateral wall 21 of the guide rail 11 is a non-return stop for the mobile carriage 8, so that the mobile carriage 8 is retained in translation in the transmission casing 2, by the guide rail 11.

The guide rail 11 serves to guide the mobile carriage 8 and to ensure that it performs only the translational movement necessary to actuate the locking finger 4 into the locking recess 5 so that the blocking mechanism 1 is in a locking position. The locking position allows a motor vehicle to be parked, for example.

The guide rail 11 is made for example from a metal strip which is on the one hand cut so as to form the notch 25 then bent three times along its length so as to form said walls of which it is composed. The metal strip has a rectangular shape before being bent. The metal strip, before bending, may also comprise a notch intended to form the notch 25 in the guide rail.

In FIG. 1, the mobile pawl 3 has an elongate shape and has a first end 31 and a second end 32 at a distance from the first end 31.

The first end 31 makes it possible to attach the mobile pawl 3 to the transmission casing 2 while allowing rotational movement of said mobile pawl 3.

The second end 32 is located at the level of the opening 26 in the guide rail 11. The second end 32 comprises the cam surface 6 located on a first lateral face of the mobile pawl 3, towards the inside of the transmission casing 2. The second end 32 further comprises the locking finger 4 projecting away from the guide rail 11 from a second lateral face of the mobile pawl 3. The locking finger 4 is intended, when the blocking mechanism is triggered, to be inserted in the locking recess 5. The locking recess 5 is for example located on a ratchet wheel 33 which is capable of receiving said locking finger 4, as shown in FIG. 1, and which is secured to, in order to rotate as one with, a transmission shaft 34 that is to be rotationally blocked.

The mobile pawl 3 further comprises a torsion spring 35. The torsion spring 35 is wound at the first end 31 of the mobile pawl 3. The torsion spring 35 comprises a first end portion 36 which bears against a bearing surface of the transmission casing, and a second end portion 37 which bears against the second lateral face of the mobile pawl 3. The torsion spring 35 is arranged so as to exert a return force on the mobile pawl 3 so as to return same towards the release position. The linear actuator 7, partially depicted in FIG. 1, which is attached to the transmission casing 2, comprises a rod 38 able to be moved in a direction orthogonal to the axes of rotation Y1 and Y2.

The rod 38 extends through the notch 25 in the guide rail 11 as far as an internal space in the guide rail 11. The rod 38 is attached to the mobile carriage 8 located in the guide rail 11.

In the cases where the mobile carriage 8 is pushed back by the mobile pawl 3 in a dynamic phase, the mobile carriage 8 comes into abutment against the lateral wall 21 of the guide rail 11, which thus forms a non-return stop for the mobile carriage 8. The mobile carriage 8 is in this case pushed against the mobile pawl 3 by a return force exerted by a compression spring 39 which surrounds the rod 38 and which includes a first end attached to the body of the actuator 7 and a second end attached to the mobile carriage 8. This effect may be produced, for example, during an attempt at engagement at excessively high speed. Beyond a threshold speed, for example between 3 km/h and 5 km/h, the mobile pawl 3 springs back so as to prevent engagement, and the mobile carriage 8 is thus pushed into abutment.

The second roller 10 of the mobile carriage 8 is able to be moved along the second longitudinal wall 23,13 of the guide rail 11. The mobile carriage 8 further comprises a cam follower formed by the first roller 9 which is in contact with the cam surface 6 of the mobile pawl 3 and capable of being moved along this cam surface 6.

The mobile carriage 8 further comprises a lug 40 located at the second end 32 of the mobile pawl 3. The lug 40 is intended to keep the mobile pawl 3 in the plane P.

In order to move the mobile pawl 3 into the locking position, the rod 38 of the linear actuator 7 is moved through the notch 25 in the guide rail 11 thus moving the mobile carriage 8 in a longitudinal direction. The mobile carriage 8 is moved from the lateral wall 21 of the guide rail 11, in the opposite direction therefrom. The movement of the mobile carriage 8 causes the second mobile roller 10 to move along the second longitudinal wall 23,13 of the guide rail 11 and causes the first roller 9 to move along the cam surface 6 of the mobile pawl 3. The cam surface 6 has a slope and the mobile carriage 8 thus exerts, via its movement, pressure towards the cam surface 6 of the mobile pawl 3. This pressure causes a rotational movement of the second end 32 of the mobile pawl 3 towards the locking recess 5 in such a way that the locking finger 4 becomes engaged in the locking recess 5 so as to lock the ratchet wheel 33.

The ratchet wheel 33 has a plurality of recesses 5 spaced apart uniformly from one another, all the way around the ratchet wheel 33. Each recess 5 of the plurality of recesses has dimensions making it possible to receive the locking finger 4 of the mobile pawl 3.

In order to move the blocking mechanism from the locking position into the release position, the rod 38 is moved in such a way as to move the mobile carriage 3 towards the lateral wall 21 until it comes into abutment against the lateral wall 21 of the guide rail 11. The locking finger 4 is disengaged from the locking recess 5 present on the ratchet wheel 33, which releases this ratchet wheel 33 and thus allows the transmission shaft 34 to rotate.

Use of the verbs "comprise" or "include" and their conjugated forms does not exclude the presence of elements or steps other than those described in a claim.

In the claims, any reference sign between parentheses should not be interpreted as limiting the claim.

The invention claimed is:

1. A gearbox comprising:
   a transmission casing; and
   a blocking mechanism contained in the transmission casing, the blocking mechanism is able to rotationally block a transmission shaft of a mobility device having a locking recess, the blocking mechanism comprising:
   a mobile pawl comprising a locking finger, the mobile pawl being pivotably mounted in a plane about a pivot axis on the transmission casing between a locking position in which the locking finger is engaged in the locking recess and a release position in which the locking finger is disengaged from said locking recess, the mobile pawl comprising a cam surface,
   a linear actuator which moves a mobile carriage, the mobile carriage comprising a first roller and a second roller,
   a guide rail attached to the transmission casing, the mobile carriage being guided by the guide rail,
   the guide rail forming an attachment wall and a guide wall which are back to back against a corresponding wall of the transmission casing, the attachment wall and the guide wall being positioned orthogonal to one another,
   the first roller is placed with a first axis of rotation arranged perpendicular to the attachment wall while being placed in contact with the second roller and with the mobile pawl,
   the second roller is placed with a second axis of rotation arranged perpendicular to the attachment wall while being placed in contact with the guide wall,
   the guide rail being mounted attached to the transmission casing by attachment means, the guide rail and the attachment means collaborating with one another in such a way that the attachment wall is held against the transmission casing while being able to be moved relative to this same attachment means,
   wherein the attachment means of the blocking mechanism is formed of a step screw having a screw head, a stepped portion and a shank, the shank being driven into the transmission casing, the stepped portion being positioned above the transmission casing. a length of the stepped portion being greater than a thickness of the attachment wall of the guide rail, and
   wherein the step screw of the blocking mechanism is inserted through an orifice formed in the thickness of the attachment wall. the orifice being of oblong shape.

2. The gearbox according to claim 1, wherein the guide rail of the blocking mechanism is made as a single piece from a bent metal strip.

3. A motor vehicle comprising a gearbox according to claim 2.

4. A transmission system comprising:
   a shaft having a locking recess; and
   a gearbox according to claim 1.

5. A motor vehicle comprising a transmission system according to claim 4.

6. A motor vehicle comprising a gearbox according to claim 1.

* * * * *